(12) United States Patent
Viste et al.

(10) Patent No.: US 11,442,740 B2
(45) Date of Patent: Sep. 13, 2022

(54) SUPPORTING INSTRUCTION SET ARCHITECTURE COMPONENTS ACROSS RELEASES

(71) Applicant: Rockwell Automation Technologies, Inc., Mayfield Heights, OH (US)

(72) Inventors: Michael J. Viste, Grafton, WI (US); Christopher W. Como, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/037,194

(22) Filed: Sep. 29, 2020

(65) Prior Publication Data

US 2022/0100527 A1   Mar. 31, 2022

(51) Int. Cl.
| | | |
|---|---|---|
| *G06F 9/38* | (2018.01) | |
| *G06F 9/30* | (2018.01) | |
| *G06F 9/54* | (2006.01) | |
| *G06F 8/65* | (2018.01) | |
| *G05B 19/05* | (2006.01) | |

(52) U.S. Cl.
CPC ......... *G06F 9/3879* (2013.01); *G05B 19/056* (2013.01); *G06F 8/65* (2013.01); *G06F 9/30145* (2013.01); *G06F 9/30174* (2013.01); *G06F 9/54* (2013.01)

(58) Field of Classification Search
None
See application file for complete search history.

(56) References Cited

U.S. PATENT DOCUMENTS

| | | | | |
|---|---|---|---|---|
| 6,460,178 B1 * | 10/2002 | Chan | ................... | G06F 9/44521 717/116 |
| 7,831,813 B2 * | 11/2010 | Hillman | .............. | G06F 9/30181 712/226 |
| 8,612,729 B2 * | 12/2013 | Hillman | .................. | G06F 21/76 712/220 |

(Continued)

FOREIGN PATENT DOCUMENTS

| | | | | | |
|---|---|---|---|---|---|
| CN | 1836210 A | * | 9/2006 | ......... | G06F 9/45516 |
| CN | 101198927 B | * | 6/2010 | ......... | G06F 9/44526 |

OTHER PUBLICATIONS

'Programming Guideline for S7-1200/S7-1500' by Siemens in Mar. 2017. (Year: 2017).*

(Continued)

*Primary Examiner* — Steven G Snyder

(57) ABSTRACT

Various embodiments of the present technology generally relate to methods and systems for providing a flexible, updatable, and backward compatible programmable logic controller ("PLC") and instruction set library. The instruction set library in the PLC can be updated without downtime of the PLC or the machines controlled by the PLC. The instruction set library is decoupled from the PLC firmware and bound via an API so that instructions in the executable code are bound to the firmware such that updates to the instruction set library can happen between scans of the executable without requiring the firmware be updated. Further, the instruction set library may be partitioned to limit updates and the amount of the complete instruction set library that is stored on the PLC to only those used by the PLC.

18 Claims, 8 Drawing Sheets

(56) References Cited

U.S. PATENT DOCUMENTS

| | | | | |
|---|---|---|---|---|
| 9,058,163 | B2* | 6/2015 | Hillman | G06F 9/3885 |
| 9,235,381 | B2* | 1/2016 | Frohberger | G05B 19/056 |
| 9,921,563 | B2 | 3/2018 | Viste | |
| 9,958,848 | B2 | 5/2018 | Rischar et al. | |
| 10,592,260 | B1* | 3/2020 | Gould | G06F 3/0482 |
| 10,671,041 | B2* | 6/2020 | Rischar | G05B 19/042 |
| 10,845,785 | B2* | 11/2020 | Kojima | G06F 8/656 |
| 2009/0158015 | A1* | 6/2009 | Hillman | G06F 9/30174 |
| | | | | 712/226 |
| 2009/0192645 | A1* | 7/2009 | Govindaraj | G05B 19/0426 |
| | | | | 700/110 |
| 2017/0214541 | A1* | 7/2017 | Brun | G05B 13/02 |

OTHER PUBLICATIONS

Anonymous, "Side-by-side Assembly," Wikipedia, Aug. 5, 2020, pp. 1-6, XP55925963, retrieved from the internet on May 30, 2022 from URL:https://en.wikipedia.org/w/index.php?title=side-by-side_assembly&oldid=971367047.

Partial European Search Report issued by the European Patent Office dated Jun. 13, 2022 in EP application No. 21195424.3, 14 pages.

* cited by examiner

US 11,442,740 B2

SUPPORTING INSTRUCTION SET ARCHITECTURE COMPONENTS ACROSS RELEASES

BACKGROUND

In industrial automation environments, many machines are controlled by programmable logic controllers ("PLCs"). PLCs are computing devices that are intended for the harsh conditions associated with an automation environment and provide extensive input/output to connect to sensors, actuators, and other control devices of the machines that are controlled by the PLCs. Because of the special types of controllers PLCs are, they often have controller firmware closely coupled to the instruction sets used to program the PLCs. Further, the instruction set used to program a PLC is historically a complete instruction set that is utilized by all PLCs regardless of the PLC's function.

SUMMARY

As described above, PLCs often have instruction set libraries that are closely coupled to the controller firmware and that are historically the entire instruction set regardless of the PLC's function. This type of architecture leads to inefficiencies, for example when the instruction set is updated, for several reasons. First, the PLC and accompanying machines must be stopped to perform the update of the instruction set and controller firmware leading to downtime for the company. Second, the PLC stores the entire instruction set, so any update that is done on the instruction set must be performed on all PLCs, sometimes even if the PLC does not include programming that uses the updated instructions. Third, because the instruction set architecture is so closely coupled to the firmware of the PLC, updates are not backward compatible and the controller firmware also requires update when the instruction set library is updated and vice versa. Finally, the size of the instruction set and the requirement to transmit/receive/download the entire instruction set library is far larger than necessary, particularly for smaller updates.

These problems are addressed using techniques and systems as described herein. In one aspect, a method for updating an instruction set library in a programmable logic controller is provided. The method may be performed by a programmable logic controller that receives an updated instruction set library that includes programming instructions. The programmable logic controller may identify affected routines, where the affected routines may include one or more of the programming instructions, and where the affected routines are executed as part of executable code of the programmable logic controller to provide input signals to and receive output signals from a physical machine in an automation environment. The programmable logic controller may bind the updated instruction set library to an application programming interface of the programmable logic controller. The programmable logic controller may rebind the affected routines to the updated instruction set library, where the rebinding is performed between scans of the executable code of the programmable logic controller. Other embodiments of this aspect include corresponding computer systems, apparatus, and computer programs recorded on one or more computer storage devices, each configured to perform the actions of the methods.

Implementations of this aspect may include additional features. Optionally, the programmable logic controller may delete the original instruction set library from memory after the update. Optionally, the programming instructions are first programming instructions, the instruction set library may include second programming instructions, and at least one of the first programming instructions is included in the second programming instructions. Optionally, the programming instructions are first programming instructions, the instruction set library may include second programming instructions, and the first programming instructions may include additional programming instructions not included in the second programming instructions. Optionally, the programming instructions are first programming instructions, the instruction set library may include second programming instructions, and a first programming instruction of the first programming instructions is an updated programming instruction of the second programming instructions. Optionally, the instruction set library is a first instruction set library of several instruction set libraries in the programmable logic controller and the programming instructions are a first subset of programming instructions, and each of the instruction set libraries may include a different subset of programming instructions. Optionally, binding the updated instruction set library to the application programming interface binds the updated instruction set library to firmware functions of the programmable logic controller. Implementations of the described techniques may include hardware, a method or process, or computer software on a computer-accessible medium.

In another aspect, a programmable logic controller includes controller firmware, a processor, and a memory. The memory has stored thereon an instruction set library containing programming instructions, a executable code that includes routines and that, when executed, cause the processor to provide input signals to and receive output signals from a physical machine in an automation environment, where each of the routines may include instructions from the programming instructions, and an application programming interface used to bind the instruction set library to the controller firmware. Other embodiments of this aspect include corresponding computer systems, apparatus, and computer programs recorded on one or more computer storage devices, each configured to perform the actions of the methods.

Implementations of this aspect may include additional features. Optionally, the instruction set library is divided into partitions, and each partition may include a subset of the programming instructions. Optionally, the instruction set library may include a portion of a complete set of instructions where the programming instructions in the instruction set library are selected from the complete set of instructions based on the routines used in the executable code of the programmable logic controller.

In yet another aspect, a method for supporting programming instructions in a programmable logic controller across versions is provided. The programmable logic controller may access an instruction set library that may include several partitions where each partition may include several programming instructions. The programmable logic controller may download a subset of the partitions based on executable code of the programmable logic controller. The programmable logic controller may bind the downloaded subset of the partitions to an application programming interface of the programmable logic controller. The programmable logic controller may bind a first routine that includes a first instruction to a first partition of the subset of partitions that includes the first instruction. Other embodiments of this aspect include corresponding computer systems, apparatus, and computer programs recorded on one or more computer storage devices, each configured to perform the actions of the methods.

Implementations of this aspect may include additional features. Optionally, the programmable logic controller may receive an updated first partition that includes the first instruction, bind the updated first partition to the application programming interface, and rebind the first routine to the updated first partition between scans of the executable code. Implementations of the described techniques may include hardware, a method or process, or computer software on a computer-accessible medium.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
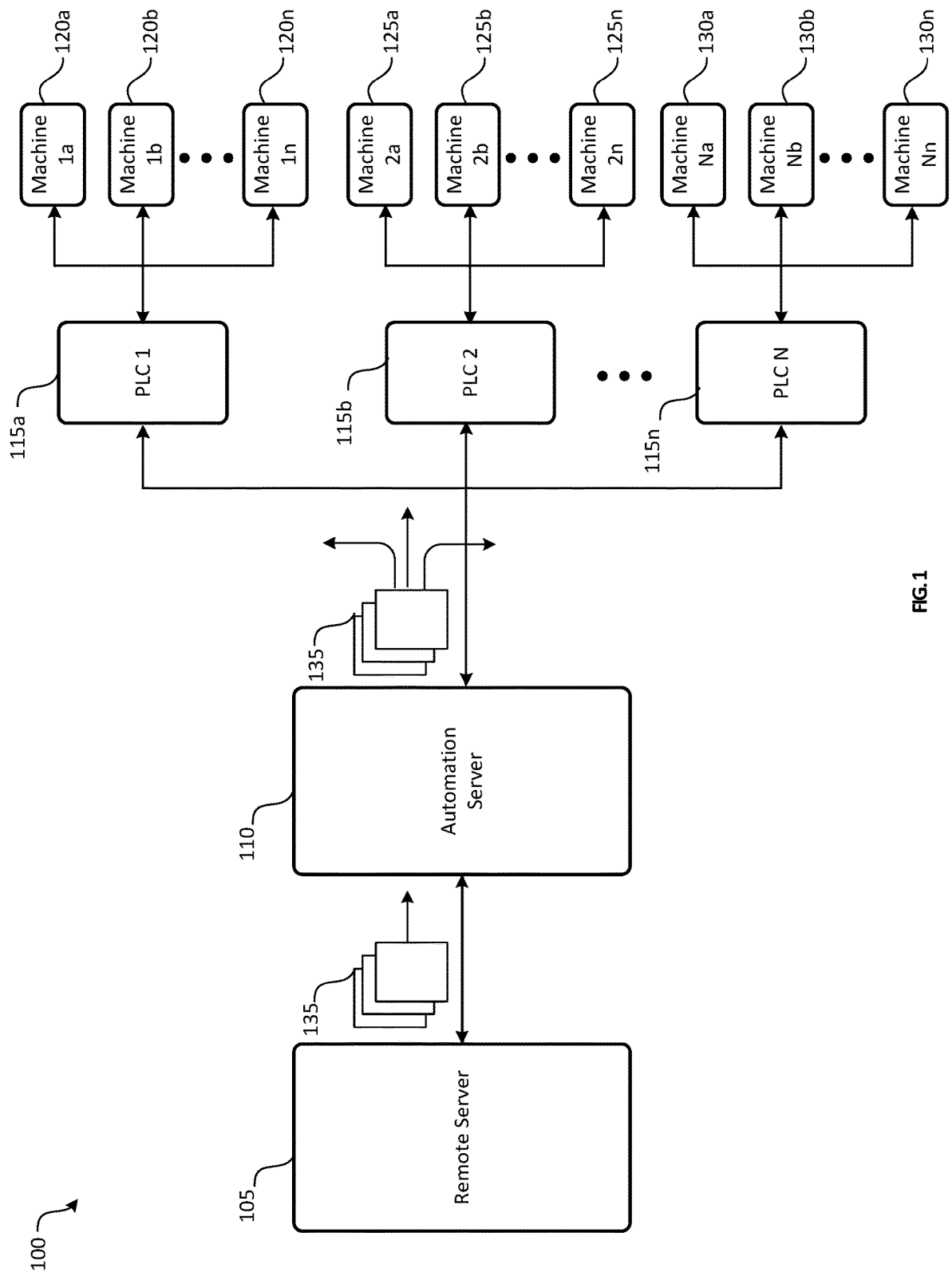
FIG. 1 illustrates an exemplary industrial automation environment, according to some embodiments.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

The figures may include elements that are groupings of similar elements that are notated as such with an element number and appended letter (e.g., machine 120a, 120b, 120n). Where an element number is followed by a letter, reference is made to the specific element. Where an element number is used without a specific letter, reference is made to the entire group or any one of the entire group (e.g., machines 120 or any one of machines 120).

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

As described above, PLCs often have instruction set libraries that are closely coupled to the controller firmware and that are historically the entire instruction set regardless of the PLC's function. This type of architecture leads to inefficiencies, for example when the instruction set is updated for several reasons. First, the PLC and accompanying machines must be stopped to perform the update of the instruction set and controller firmware leading to downtime for the company. Second, the PLC stores the entire instruction set, so any update that is done on the instruction set must be performed on all PLCs, sometimes even if the PLC does not include programming that uses the updated instructions. Third, because the instruction set architecture is so closely coupled to the firmware of the PLC, updates are not backward compatible and the controller firmware also requires update when the instruction set library is updated and vice versa. Finally, the size of the instruction set and the requirement to transmit/receive/download the entire instruction set library is far larger than necessary, particularly for smaller updates.

To address these and other issues, systems and methods are described herein to decouple the instruction set architecture from programmable logic controller ("PLC") firmware as well as, in some embodiments, partition the instruction set library. By doing so, PLCs may obtain updates to only the instruction set library partitions that impact that particular PLC. Also, the updates can be performed between scans of the PLC's executable code, which avoids downtime for the automation environment. Further, the instruction set libraries can be backward compatible when decoupled from the controller firmware. These improvements are described in more detail with respect to the figures.

Turning now to FIG. 1, an exemplary automation environment 100 is depicted in a simplified block diagram format. The automation environment 100 includes a remote server 105, automation server 110, programmable logic controllers 115, and machines 120, 125, and 130. The automation environment 100 may be any automation environment including, for example, an oil refinery, an automotive automation line, and so forth.

Figure 8:
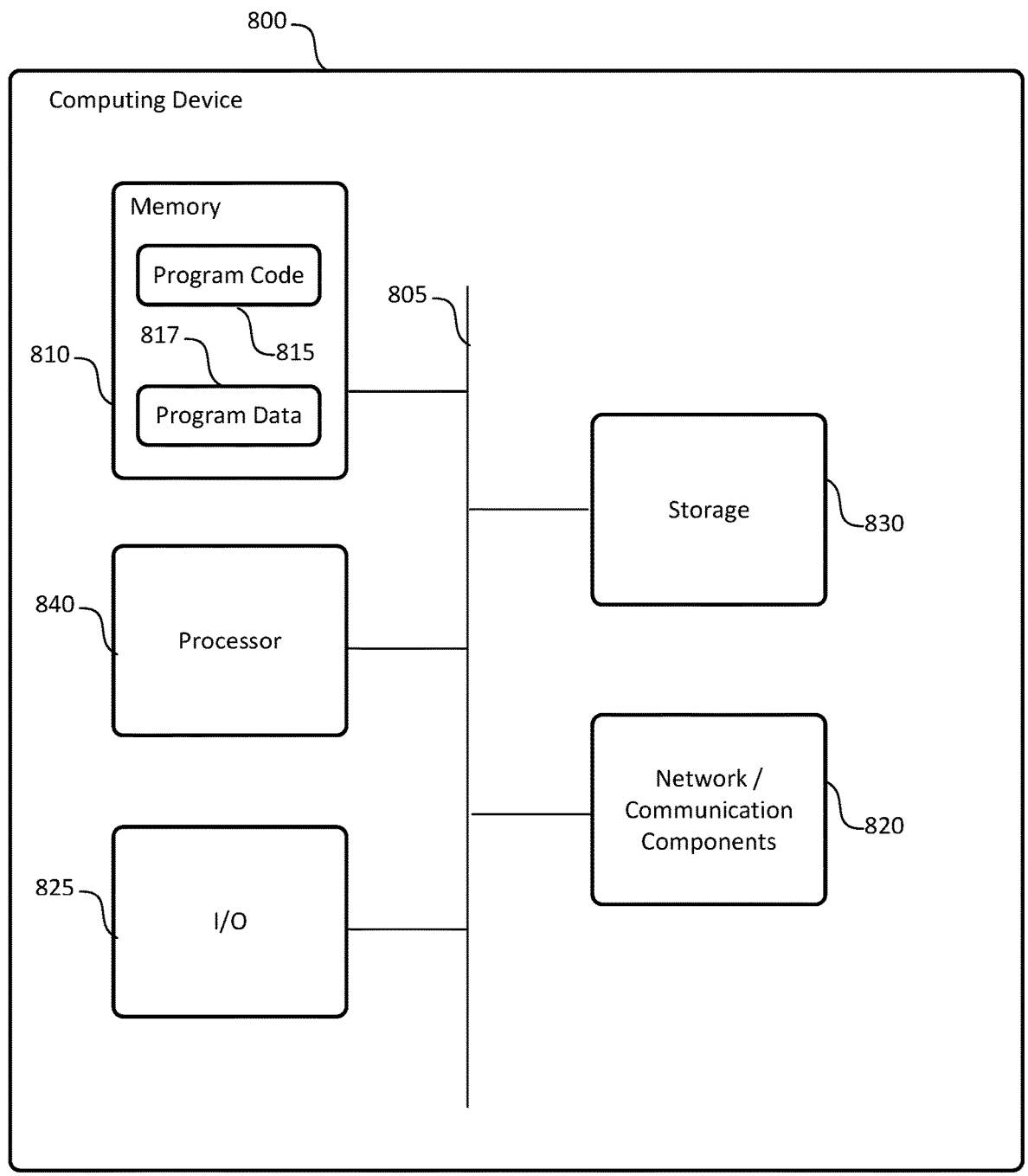
FIG. 8 illustrates an exemplary computing device, according to some embodiments.

The remote server 105 may be any one or more suitable computing devices such as, for example, computing device 800 as described with respect to FIG. 8. The remote server 105 may be a computing device from which updates 135 to portions of a programmable logic controller ("PLC") 115 may be served. The updates 135 provided to PLCs 115 may include instruction set updates, firmware updates, routine updates, and so forth. The instruction set architecture includes an instruction set library that provides the foundation of the instructions used to program a PLC 115 for controlling a machine 120, 125, 130. Such instructions include the functions that can be used for reading and writing input and output values to the machines 120, 125, 130. When updates occur, instructions are added, removed, or updated in the instruction set library or other changes within the instruction set library or a partition of the instruction set library are made. For example, a data type modification may be an update, which may include a modification to the data type or may include a modification of the data type used for an instruction. The update 135 is sent from the remote server 105 to the automation server 110 for proliferating to the PLCs 115 to implement the update 135. An update 135 may be an update to one or more partitions of the instruction set library or to the entire instruction set library.

The automation server 110 may be any one or more suitable computing devices such as, for example, computing device 800 as described with respect to FIG. 8. The automation server 110 may be one or more centralized servers for providing information to and receiving information from PLCs 115 within the automation environment 100. For example, the automation server 110 may receive the updates 135 from the remote server 105 and proliferate the updates 135 to the PLCs 115. In some embodiments, the automation server 110 may make decisions upon receipt of updates 135 as to which PLCs 115 should receive the updates. In some embodiments, the updates reside in automation server 110 and the PLCs 115 may access and download appropriate updates 135 as needed. For example, automation server 110 may send a notification to PLCs 115 to notify them of an available update. In some embodiments, automation server 110 may notify only impacted PLCs 115 of the available update. As described in more detail with respect to FIG. 2, an update 135 may include an instruction set library partition. As an example, PLC 115a may utilize the updated instruction set partition included in update 135 while PLC 115b may not utilize the updated instruction set partition. In such an example, the automation server 110 may not provide the update 135 to PLC 115b but will provide it to PLC 115a or PLC 115a will download the update 135 while PLC 115b will not download the update 135.

Programmable logic controllers ("PLCs") 115 are computing devices that are developed and designed to be rugged to withstand the harsh conditions associated with an industrial automation environment and provide extensive input/output to connect to sensors, actuators, and other control devices of the machines 120, 125, 130 that are controlled by the PLCs 115. PLCs 115 may be any suitable programmable computing devices such as, for example, programmable logic controller 700 as described with respect to FIG. 7. While three PLCs 115 are depicted in FIG. 1, the automation environment may include any number of PLCs 115 as shown by PLC 115a through PLC 115n. And, each PLC 115 is depicted as controlling at least one of machines 120, 125, 130. For example, PLC 115a controls machines 120a, 120b, and 120n, which indicates that PLC 115a may control any number of machines 120. Similarly, PLC 115b controls machines 125a, 125b, and 125n indicating that PLC 115b may control any number of machines 125, and PLC 115n controls machines 130a, 130b, and 130n indicating PLC 115n controls any number of machines 130. Machines 120, 125, 130 may be any industrial automation machines having input and output that can be received from and sent to PLCs 115.

In use, a programmer may use the instruction sets available on PLCs 115 to develop logic that is utilized in executable code of the PLC 115. The executable code may include programs that may contain routines developed using the programming instructions in the PLC 115 and that read and write input and output values to and from the machines 120, 125, 130 such that as the executable code of the PLC 115 is executed, the machines 120, 125, 130 perform operations under the control of the PLC 115 based on the execution of the executable code. The remote server 105 may provide an update 135 of one or more instruction set libraries or library partitions to the automation server 110. The Automation server 110 may determine which PLCs 115 should be updated with the update 135 and provides the update 135 to the appropriate PLCs 115 or sends a notice of the update 135 to PLCs 115, which may then access and download the update 135. The receiving PLCs 115 may update the instruction set library or library partitions between scans of the executable code as will be described in more detail with respect to FIG. 5.

Figure 2:
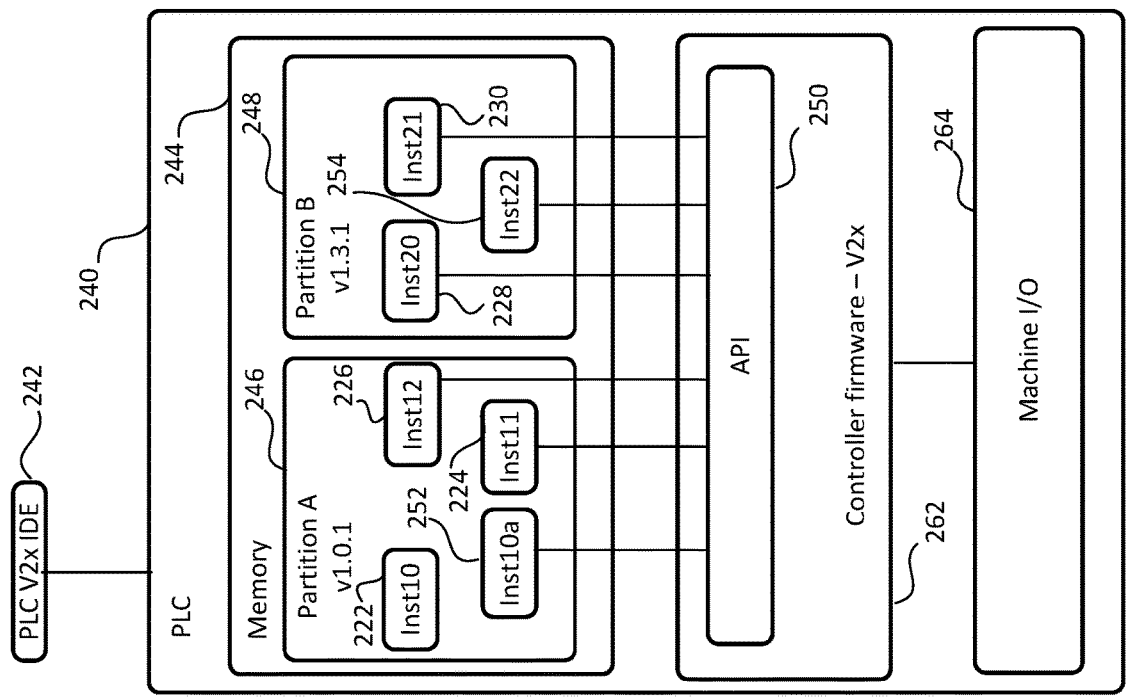
FIG. 2 illustrates exemplary programmable logic controllers, according to some embodiments.
Figure 2:
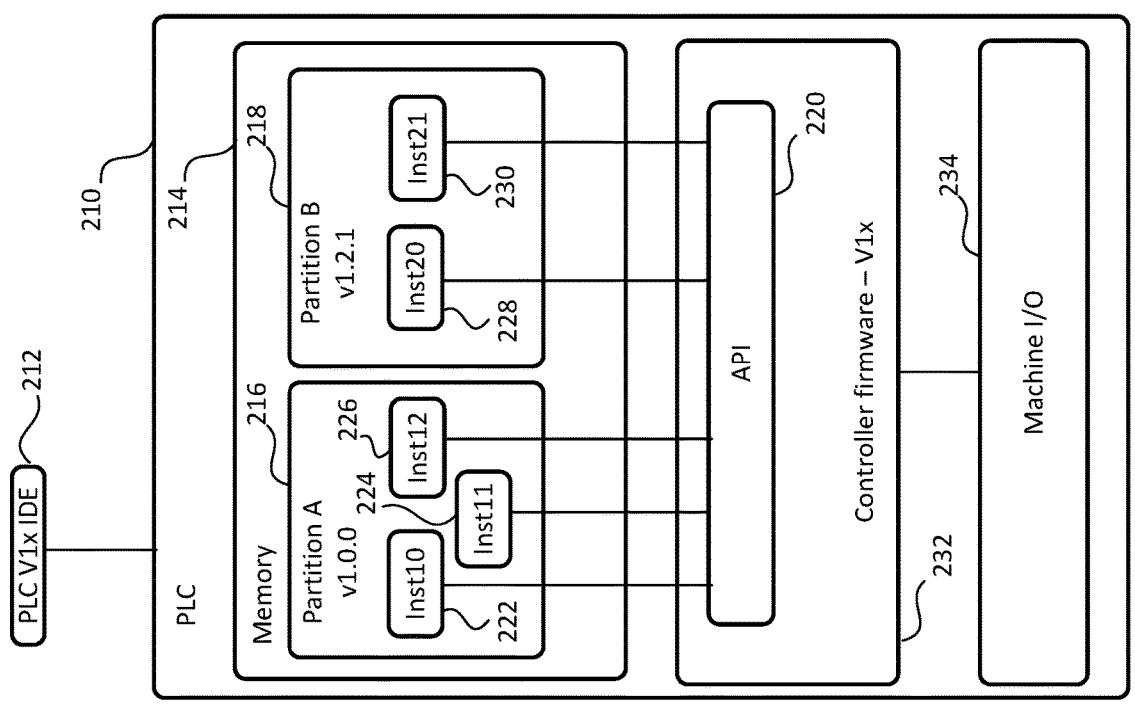

FIG. 2 illustrates an exemplary PLC 210 and an exemplary PLC 240. The PLC 210 is operating with a first integrated development environment ("IDE") version. In the case of PLC 210, the IDE version is identified as V1x 212. PLC 210 includes memory 214, controller firmware 232, and machine I/O 234. PLC 210 may include other components not included here for simplicity. For example, PLC 210 may include components of PLC 700 as described with respect to FIG. 7.

Machine I/O 234 is the input and output interfaces in PLC 210 that can be coupled to the machines (e.g. machines 120, 125, 130 as described with respect to FIG. 1) that PLC 210 controls. The machine I/O 234 is used to send (i.e., output) and receive (i.e., input) signals to and from the machines being controlled by PLC 210.

Controller firmware 232 includes API 220. Controller firmware 232 is versioned based on the IDE version, in this case V1x. The IDE defines the development environment such as, for example, the compiler that is used to compile the programmed executables within the PLC 210. Differing versions of the IDE may impact compatibility between PLC programming components. For example, the controller firmware 232 is flashed to be compatible with a given IDE version, in this case V1x. The controller firmware 232 interfaces with the machine input/output ("I/O") 234. Accordingly, the instruction set library available to the controller firmware 232 via the binding of the API 220 with the partitions in memory 214 should be compatible with the controller firmware 232 to provide proper instructions to the machine I/O 234 to ensure the machines being controlled by the PLC receive the proper instructions. In the past, an update to the instruction set library, which was closely coupled to the controller firmware would have failed to work properly if the instruction set library was not compiled with the same version of the IDE known to the PLC controller firmware. The described architecture of PLCs 210, 240 allows for backward compatibility. As such, for example, PLC 210 may be updated with version 1.3.1 of partition B 248.

The memory 214 includes partition A 216 and partition B 218. Partition A 216 and partition B 218 were compiled with IDE version V1x. Partition A 216 is version 1.0.0 (compiled with IDE version V1x) and includes instructions 222, 224, 226. These instructions may be used to develop logic for controlling machines, such as machines 120, 125, and 130 as described with respect to FIG. 1. The instructions 222, 224, 226 are instructions forming an instruction set library within partition A 216. Partition A 216 may also be called an instruction set library partition or a subset of instructions. Instructions 222, 224, 226 are a subset of instructions from an overall instruction set library. The overall instruction set library is a complete set of instructions that may be used within logic that is executed by the PLC 210 to control physical machines in an industrial automation environment such as automation environment 100 as described with respect to FIG. 1. By partitioning the overall (i.e., complete or entire) instruction set library into partitions such as partition A 216 and partition B 218, the overall instruction set library need not be provided to every PLC 210, 240. For example, a customer having an oil and gas environment may not need certain instructions in some partitions that may be used, for example, in an automotive automation line. In some embodiments, partitions may be created for specific industries or machines.

Partition B 218 is version 1.2.1 (compiled with IDE version V1x) and includes instructions 228, 230. These instructions may also be used to develop logic for controlling machines controlled by PLC 210. Partition B 218 is similar to partition A 216 in that it may also be called an instruction set library partition or a subset of instructions and may include some or all of the instructions in the complete instruction set library.

The instructions 222, 224, 226 in partition A 216 are bound to the application programming interface ("API") 220. The instructions 228, 230 in partition B 218 are also bound to API 220. The API 220 provides the interface for the partitions to communicate with the controller firmware 232. The controller firmware 232 communicates with machine I/O 234. This binding allows the correlation of the instructions 222, 224, 226, 228, 230 within partition A 216 and partition B 218 to the controller firmware 232, which is used to control machines (e.g., machines 120, 125, 130 as described with respect to FIG. 1) via the machine I/O 234. The controller firmware 232 provides the interface between the machine I/O 234 and the software utilizing the instructions 222, 224, 226, 228, 230. The controller firmware 232 includes access to controller and embedded functions such as operating system functions, the controller scheduler, timers, input and output of the controller (e.g., machine I/O 234), and the hardware abstraction layer.

PLC 240 is operating with a second IDE version. In the case of PLC 240, the IDE version is identified as V2x 242. Version V2x indicates a newer version than the IDE version V1x. PLC 240 is configured similarly to PLC 210. PLC 240 includes memory 244, controller firmware 262, and machine I/O 264. The controller firmware 262 communicates with machine I/O 264 to exchange signals (i.e., I/O) with the machines that PLC 240 controls. The API 250 provides the interface for the instructions within partitions in memory 244 that are bound to API 250 to communicate with the controller firmware 262. Memory 244 includes partition A 246 and partition B 248. Partition A 246 is a newer version of partition A 216. Where partition A 216 was version 1.0.0, partition A 246 is version 1.0.1. Partition A 246 was compiled with IDE version V2x. Partition B 248 is a newer version of partition B 218. Where partition B 218 is version 1.2.1, partition B 248 is version 1.3.1. Partition B 248 was compiled with IDE version V2x. Instruction 252 is an update of instruction 222 in partition A 246. Instruction 254 is a new instruction added into partition B 248.

Figure 3:
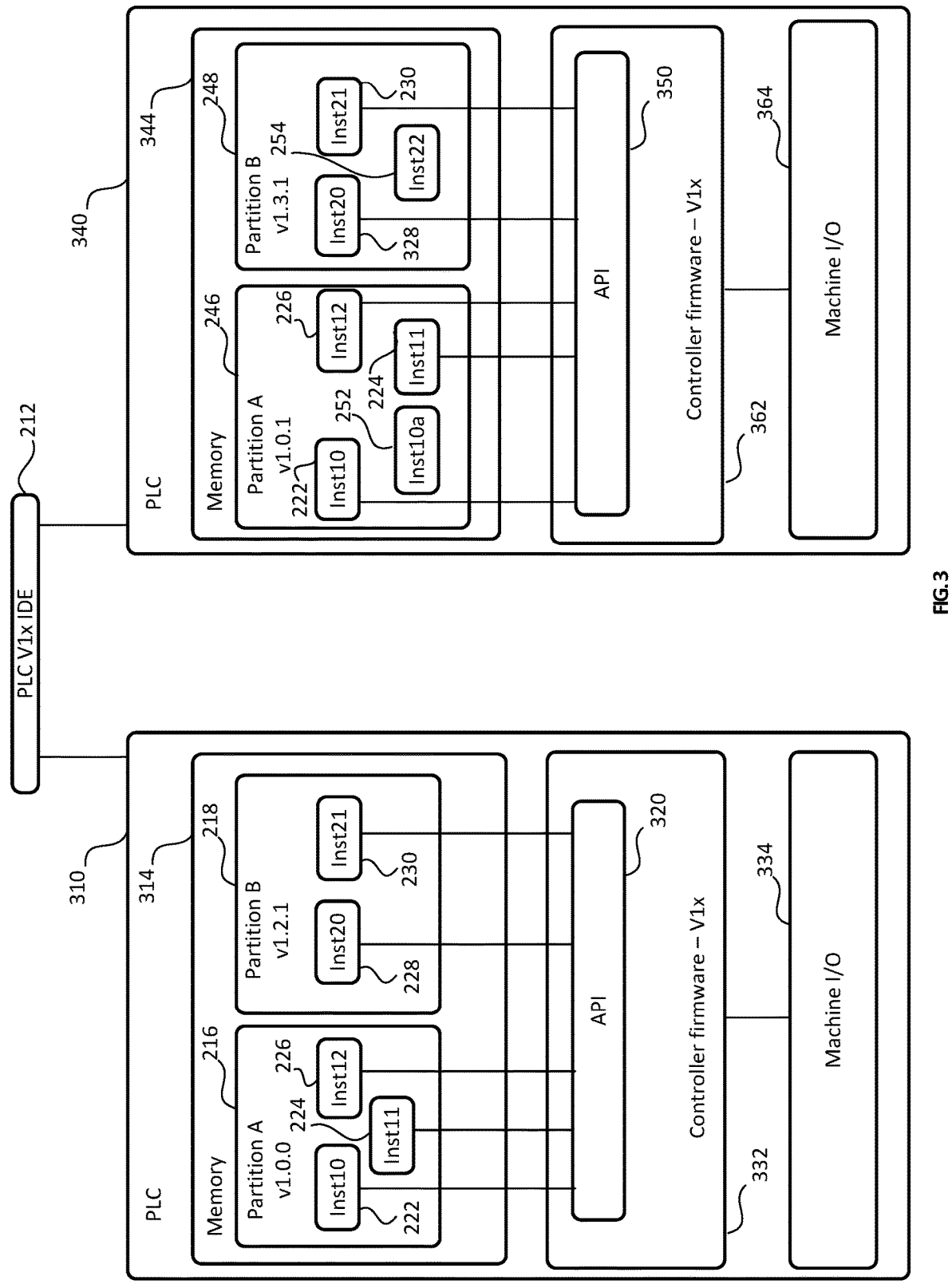
FIG. 3 illustrates exemplary programmable logic controllers, according to some embodiments.

The inclusion of the instruction set library in partitions in the memory 244 and the decoupling of the instruction set library from the controller firmware allow for multiple advantages. Partitioning the instruction set library limits the updates and downloads needed for PLCs 210, 240 to those partitions that are used by the PLC 210, 240 respectively. Decoupling the partitions 216, 218 from the controller firmware 232 and partitions 246, 248 from controller firmware 262 allows the PLC 210, 240 to be updated without stopping the PLC 210, 240 to flash the controller firmware 232, 262. This allows updates to the partitions 216, 218, 246, 248 to occur between scans of the executable code (e.g., programs 420 as described with respect to FIG. 4) of the respective PLC 210, 240 that utilizes the instructions 222, 224, 226, 228, 230, 252, 254. Further, the architecture allows for backward compatibility. The controller firmware 262 of PLC 240 is using IDE version V2x (i.e., a higher version) than the controller firmware 232 of PLC 210 that is using IDE version V1x. As shown, partition A 216 in PLC 210 includes three instructions 222, 224, 226. Partition A 246 in PLC 240 is a higher version 1.0.1 than partition A 216, and partition A 246 in PLC 240 includes instructions 222, 224, 226, and an additional instruction 252. Instruction 252 is an updated instruction of instruction 222. Yet, partition A 246 is backward compatible with partition A 216 because the old instruction 222 is included in partition A 246. Instruction 222 is not bound to API 250 because instruction 252, which is updated, is bound. As shown in FIG. 3 and described further below, a PLC with an older IDE version would bind instruction 222 to the API and not bind instruction 252. Partition B 218 in PLC 210 is version 1.2.1, and partition B 248 in PLC 240 is version 1.3.1—a higher version. Partition B 248 includes an additional instruction 254 than is included in the partition B 218 in PLC 210. Since instruction 254 is not available or used in older versions, partition B 248 can be backward compatible by not binding instruction 254 to the API in controller firmware using previous IDE versions than V2x, which is what was used to compile partition B 248. In some embodiments, instructions in partitions may be removed by not binding the instructions to the API in the later versions while still including the instruction and binding it to the API in controllers with older versions of the IDE. Backward compatible partitions are described in more detail with respect to FIG. 3.

FIG. 3 illustrates two PLCs 310, 340. PLC 310 and PLC 340 are each operating with the controller firmware 332, 362 using IDE version V1x as shown by IDE component 212. PLC 310 includes memory 314, controller firmware 332, and machine I/O 334. PLC 310 may include other components, such as those described with respect to PLC 700 of FIG. 7, that are not included here for simplicity. Memory 314 includes partition A 216 having version 1.0.0 and partition B 218 having version 1.2.1, each having been compiled with IDE version V1x. Partition A 216 and partition B 218 are described further with respect to FIG. 2. Partition A 216 includes instructions 222, 224, 226. Partition B 218 includes instructions 228, 230. The instructions 322, 324, 326, 328, 330 in PLC 310 are bound to API 320. Controller firmware 332 is using IDE version V1x and includes API 320. API 320 allows the bound instructions in memory 314 to access controller firmware 332. The controller firmware 332 communicates with machine I/O 334 to send signals to and receive signals from the machines coupled to the machine I/O 334. Accordingly, the instructions within memory 314 are used to control the machines coupled to the machine I/O 334 via the controller firmware 332 and API 320. Each of the instructions 222, 224, 226, 228, 230 are bound to API 320 because the partition A 216 and partition B 218 were compiled with the same IDE version V1x that the controller firmware 332 is using.

PLC 340 includes memory 344, controller firmware 362, and machine I/O 364. PLC 340 may include other components, such as those described with respect to PLC 700 of FIG. 7, that are not included here for simplicity. Memory 344 includes partition A 246 having version 1.0.1 and partition B 248 having version 1.2.1, each having been compiled with IDE version V2x. Partition A 246 and partition B 248 are described further with respect to FIG. 2. Partition A 246 includes instructions 222, 224, 226, 254. Partition B 248 includes instructions 228, 230, 250. Instructions 222, 224, 226, 228, 230 in PLC 340 are bound to API 350. Controller firmware 362 includes API 350. API 350 allows the bound instructions in memory 344 to access controller firmware 362. The controller firmware 362 communicates with machine I/O 364 to send signals to and receive signals from the machines coupled to the machine I/O 364. Accordingly, the instructions within memory 344 that are bound to API 350 are used to control the machines coupled to the machine I/O 364 via the controller firmware 362 and API 350.

Instructions 252, 254 are not bound to API 350 in PLC 340 because controller firmware 362 is using IDE version V1x (i.e., an older version of the IDE). Partition A 246 and partition B 248 were each compiled with IDE version V2x, but both are backward compatible. Updated instruction 252 that replaces instruction 222 in version 1.0.1 of partition A 246 compiled with version V2x of the IDE is not bound to the API in controller firmware using older versions of IDE, and the old instruction 222 is still included in partition A 246 so it can be bound to the API of controller firmware using older IDE versions. Accordingly, as shown in PLC 340 having controller firmware 362 using an older version of the IDE (V1x) than was used to compile the partition A 246, the legacy instruction 222 is bound to the API 350 from partition A 246, and in PLC 240 (referring back to FIG. 2) having the same version of the IDE (V2x) as was used to compile the partition A 246, the new instruction 252 is bound to the API 250 from partition A 246 and the legacy instruction 222 is not bound to the API 250. Similarly, the new instruction 254 in partition B 248 is not bound to API 350 because controller firmware 362 does not support the new instruction because it is using the older IDE version (V1x), but the new instruction 254 in partition B 248 is bound to API 250 in PLC 240 (referring back to FIG. 2) because the controller firmware 262 does support the new instruction because it is using the same IDE version (V2x) that was used to compile the partition B 248. Therefore, the decoupled architecture of the instruction set library (e.g., partitions in memory) from the controller firmware allows for backward compatibility of the instruction set library to PLCs using older versions of an IDE than was used to compile the instruction set library.

Figure 4:
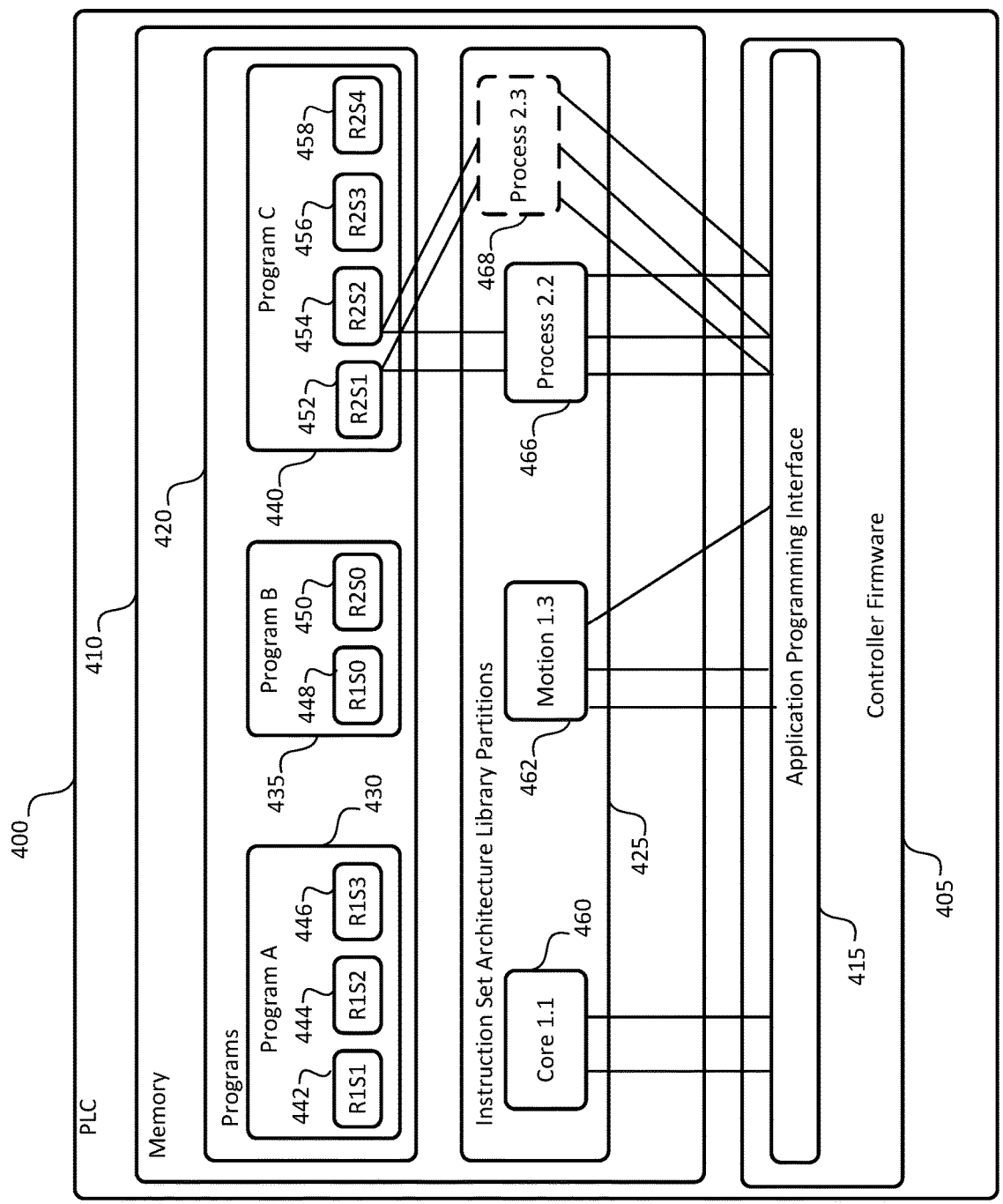
FIG. 4 illustrates an exemplary programmable logic controller during a partition update, according to some embodiments.

Turning now to FIG. 4, an explanation of the updating of the instruction set libraries is described. FIG. 4 illustrates a PLC 400. PLC 400 may be any suitable programmable logic controller in an industrial automation environment such as automation environment 100 as described with respect to FIG. 1. PLC 400 may include additional components than are described here for clarity. The additional components may include components such as those described with respect to PLC 700 as described with respect to FIG. 7. PLC 400 includes memory 410 and controller firmware 405. Memory 410 includes API 415, programs 420, and instruction set architecture library partitions 425.

Programs 420 may include any number of programs 430. 435, 440. Programs 420 includes three programs, program A 430, program B 435, and program C 440, but may include more or fewer programs depending on the machines, such as machines 120, 125, 130 described in FIG. 1, that PLC 400 is controlling. Each of these programs may be executed by a processor (not shown) sequentially. For example, program A 430 may be the first in the sequence, so program A 430 is executed first, then the next program is executed, for example program B 435, and then the next, for example program C 440, until there are no further programs to be executed. Completion of the sequence is a scan, and once a scan is complete, the sequence starts over with the first program to perform another scan. Within each program are routines that are also executed sequentially. For example, program A 430 includes routines 442, 444, 446 that are executed sequentially. The programs (e.g., program A 430, program B 435, and program C 440) within programs 420 are the executable code of PLC 400. Program A 430 includes routines 442, 444, 446. Each routine, such as routine 442 for example, is built using the instructions from the instruction set library. A technician may program the PLC 400 using, for example, ladder logic programming that uses the instructions from the instruction set library, to build the routines, such as routine 442, that are executed on PLC 400 by a processor. Ladder logic resembles ladders with two vertical rails and a series of horizontal rungs between them. The rungs each include instructions from the instruction set library. When executing, the rungs are executed sequentially to sequentially execute the routines and programs for a complete scan of the executable code. In some embodiments, the scans occur many times per second.

Program B 435 may include, for example, routines 448, 450. Program C 440 may include routines 452, 454, 456, 458, for example. Each program within programs 420 may include any number of routines.

Within memory 410 are instruction set architecture library partitions 425. These partitions include subsets of instructions that are from the overall instruction set library supported by the PLC 400. As described with respect to FIG. 2, the partitions may include any number of instructions. Instruction set library partitions 425 includes core 1.1 partition 460, motion 1.3 partition 362, and process 2.2 partition 466. The core 1.1 partition 460 may include core instructions for PLC 400, and the version of the partition may be version 1.1. The motion 1.3 partition 362 may include instructions from the instruction set library used for motion controls of one or more machines controlled by PLC 400. The motion 1.3 partition 362 may be version 1.3. The process 2.2 partition 466 may include instructions from the instruction set library for completing a process with one or more machines controlled by PLC 400. Process 2.2 partition 466 may be version 2.2. As shown, core 1.1 partition 460 is bound to API 415, motion 1.3 partition 462 is bound to API 415, and process 2.2 partition 466 is bound to API 415, as described with respect to FIG. 2. API 415 provides the interface to controller firmware 405 as described with respect to FIG. 2. Accordingly, the instructions within each partition 460, 462, 466 are bound to controller firmware 405 via API 415.

PLC 400 may receive updated process 2.3 partition 468. Process 2.3 partition 468 may be version 2.3 of the process instruction set library partition, and is intended to replace process 2.2 partition 466. Upon receipt of the process 2.3 partition 468, the PLC 400 determines which routines within the programs 420 are impacted by the update. For example, if a routine includes an instruction within the process 2.2 partition 466, the routine will be deemed impacted. In some embodiments, the IDE (not shown) within PLC 400 may determine which routines are impacted. In some embodiments, the controller may determine which routines are impacted. In the example shown in FIG. 4, at least one instruction within routine 452 and routine 454 are impacted by the update. Between scans of the executable code, so that the PLC 400 and associated machines need not be shut down, the PLC 400 binds the instructions within process 2.3 partition 468 to the API 415 and breaks the binding between the instructions within process 2.2 partition 466 and API 415. Additionally, the PLC 400 rebinds the instructions within process 2.3 partition 468 with the impacted routines 452, 454 and breaks the binding between the instructions within process 2.2 partition 466 and impacted routines 452, 454. By completing this breaking of bindings and new binding to the API and rebinding of the instructions with the updated partition 468, the process 2.2 partition 466 is updated. Process 2.2 partition 466 may be deleted from memory 410, in some embodiments. On the next scan of the executable code, the instructions from the updated process 2.3 partition 468 are used for execution.

As shown in FIG. 4, the instruction set architecture library partitions 425 include various partitions 460, 462, 466, 468 including core instructions, motion instructions, and process instructions. The complete instruction set library that is supported by PLC 400 may include many more programming instructions that are not included in the subsets of programming instructions that are within in partitions 460, 462, 466. The routines used to control the machines that PLC 400 controls may not include all the instructions from the complete instruction set library, and therefore including every instruction within the instruction set architecture library partitions is not necessary. Further, various industries have differing needs, and therefore there may be instruction set partitions that include appropriate instructions needed for a given industry or machine and exclude other instructions. The instruction set partitions created for various industries or machines may overlap (i.e., contain some of the instructions but not others) those instruction set partitions created for other industries or machines. For example, a given Machine A may have a motion partition including instructions that are different from or in some cases overlap the motion partition for a different Machine B. In some embodiments, a single partition may be used and may include a subset or all of the instructions in the instruction set library. Even if partitions are not used to limit the number of instructions in the PLC 400, the decoupling of the instruction set library from the controller firmware provides benefits such as "hot" updates that do not require downtime of the PLC or machines.

FIG. 4 depicts the components of a PLC 400 involved in the updating process. FIG. 4 may be used to describe the initial setup of PLC 400 as well. PLC 400 may access an instruction set library that is stored, for example, in automation server 110 as described with respect to FIG. 1. The instruction set library may include instruction set library partitions, and the PLC 400 may download the instruction set library partitions that are appropriate for the PLC 400 based on the machines that PLC 400 controls. In the example shown, PLC 400 downloads core 1.1 partition 460, motion 1.3 partition 462, and process 2.2 partition 466. After downloading, PLC 400 binds the instructions within each partition 460, 462, 466 to API 415. The instructions within routines of programs in programs 420 are bound to the appropriate partitions 460, 462, 466 as the programs and routines are developed. Further, in some embodiments, the entire instruction set library used for PLC 400 may be in a single partition. In some embodiments, the complete instruction set library available for use on PLC 400 may be in a single partition. As such, the benefits of decoupling the instructions from the controller firmware are still realized.

Figure 5:
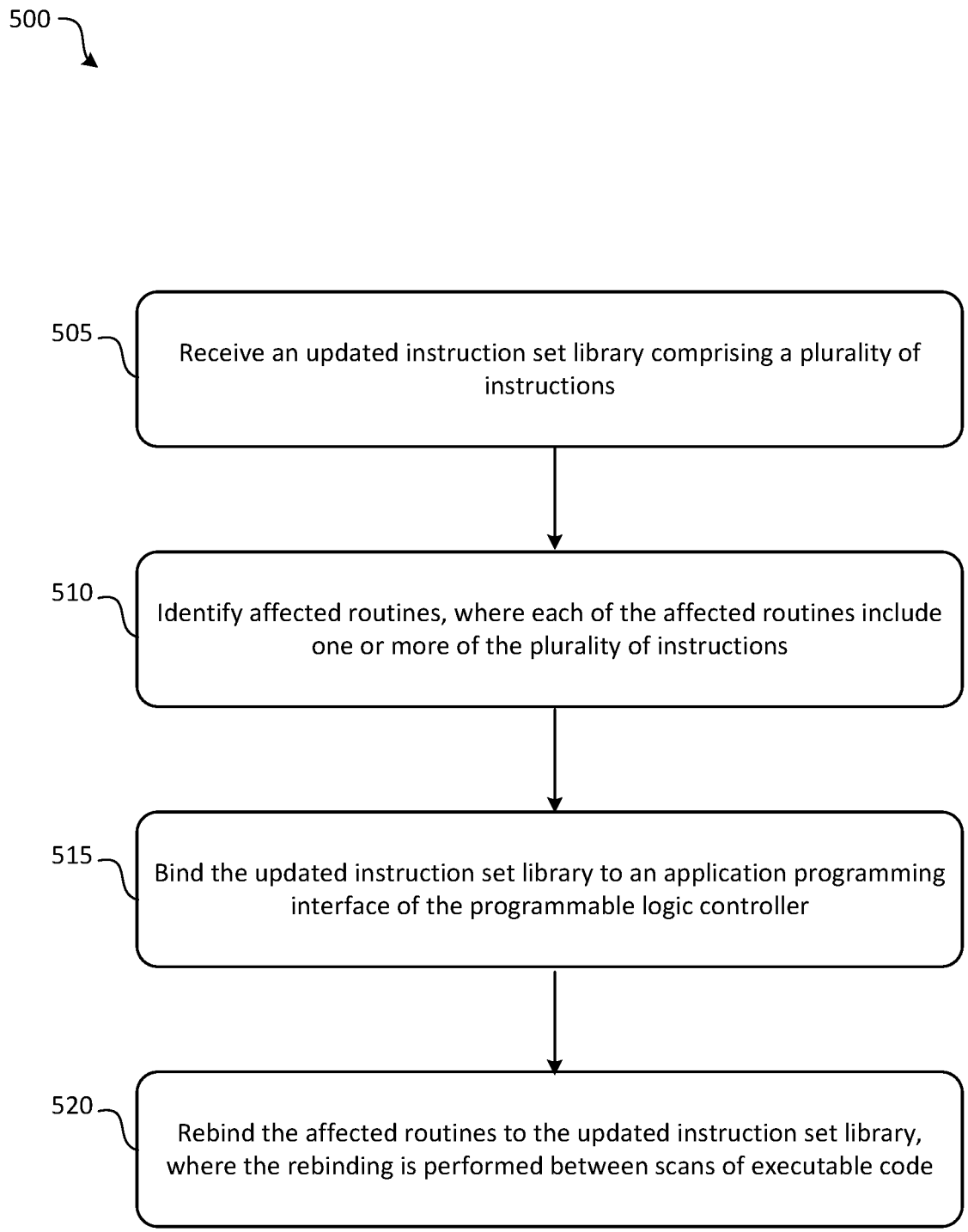
FIG. 5 illustrates an exemplary process for updating an instruction set library partition without machine downtime, according to some embodiments.

FIG. 5 illustrates a method 500 for updating an instruction set library. The method 500 may be performed by, for example PLC 400, PLC 210, PLC 240, and/or PLC 115. The PLC may receive an updated instruction set library comprising a plurality of instructions at step 505. For example, as shown in FIG. 4, PLC 400 received updated process 2.3 partition 468. In some embodiments, only a single partition or instruction set library is used in the PLC. In some embodiments, the update may include multiple partitions that are updated.

At step 510, the PLC identifies affected routines, where the affected routines include one or more of the instructions. For example, as shown in FIG. 4, routine 452 and routine 454 each included one or more instructions within process 2.2 partition 466 and therefore those routines 452, 454 were affected. In some embodiments, the PLC IDE may determine which routines are affected, and in other embodiments, the PLC may determine which routines are affected (i.e., impacted). The PLC IDE may determine which routines are affected in a compile-time analysis. For example, the IDE is aware of which routines utilize which instructions based on compiling the routines, and the IDE can identify which routines are affected based on the instructions that are within the update. The IDE may provide the affected routine information with the update such that the PLC can implement the update based on the routines identified by the IDE with the update. As another example, the PLC may determine which routines are affected based on a link-time analysis. The PLC knows which routines were bound to a given instruction, so if the instruction is included in the update, the PLC can identify the affected routines based on the previous bindings.

At step 515, the PLC binds the updated instruction set library to an application programming interface of the programmable logic controller. For example, as described with respect to FIG. 4, the PLC 400 binds the process 2.3 partition 468 to API 415. In some embodiments, upon binding the updated instruction set library to the API, the PLC unbinds the old instruction set library that is being replaced from the API.

At step 520, the PLC rebinds the affected routines to the updated instruction set library, where rebinding is performed between scans of the executable code. For example, the PLC 400 rebinds the instructions within process 2.3 partition 468 to routines 452, 454. In some embodiments, rebinding the instructions in the updated instruction set library to the affected routines unbinds the instruction in the old instruction set library from the routines. Upon completing the rebinding of step 520, in some embodiments, the old instruction set library is deleted from the PLC memory by the PLC. Upon completion of the rebinding, the instructions used in the affected routines are bound via the API to the controller firmware such that the new instructions and routines will effectively control the machines controlled by the PLC.

In some embodiments, the updated instruction set library may include instructions from the old instruction set library. For example, as shown in FIG. 2, the 1.0.0 version of partition A 216 includes instructions 222, 224, 226, and the 1.0.1 version of partition A 246 also includes instructions 222, 224, 226. Additionally, in some embodiments, the updated instruction set library may include an updated instruction over the old instruction in the old instruction set library. For example, as shown in FIG. 2, the 1.0.0 version of partition A 216 includes instruction 222, and the 1.0.1 version of partition A 246 includes updated instruction 252 to replace old instruction 222. To replace the instruction in the newer versions of the partition and the IDE, the new instruction is bound to the API rather than the old instruction. In older versions of the IDE, the old instruction is bound to the API rather than the new instruction if the new instruction is not supported in the older version of the IDE. Further, in some embodiments, new instructions may be added in the updated instruction set library. For example, as shown in FIG. 2, the 1.2.1 version of partition B 218 includes instructions 228, 230, and the 1.3.1 version of partition B 248 includes a new instruction 254 in addition to instructions 228, 230.

Figure 6:
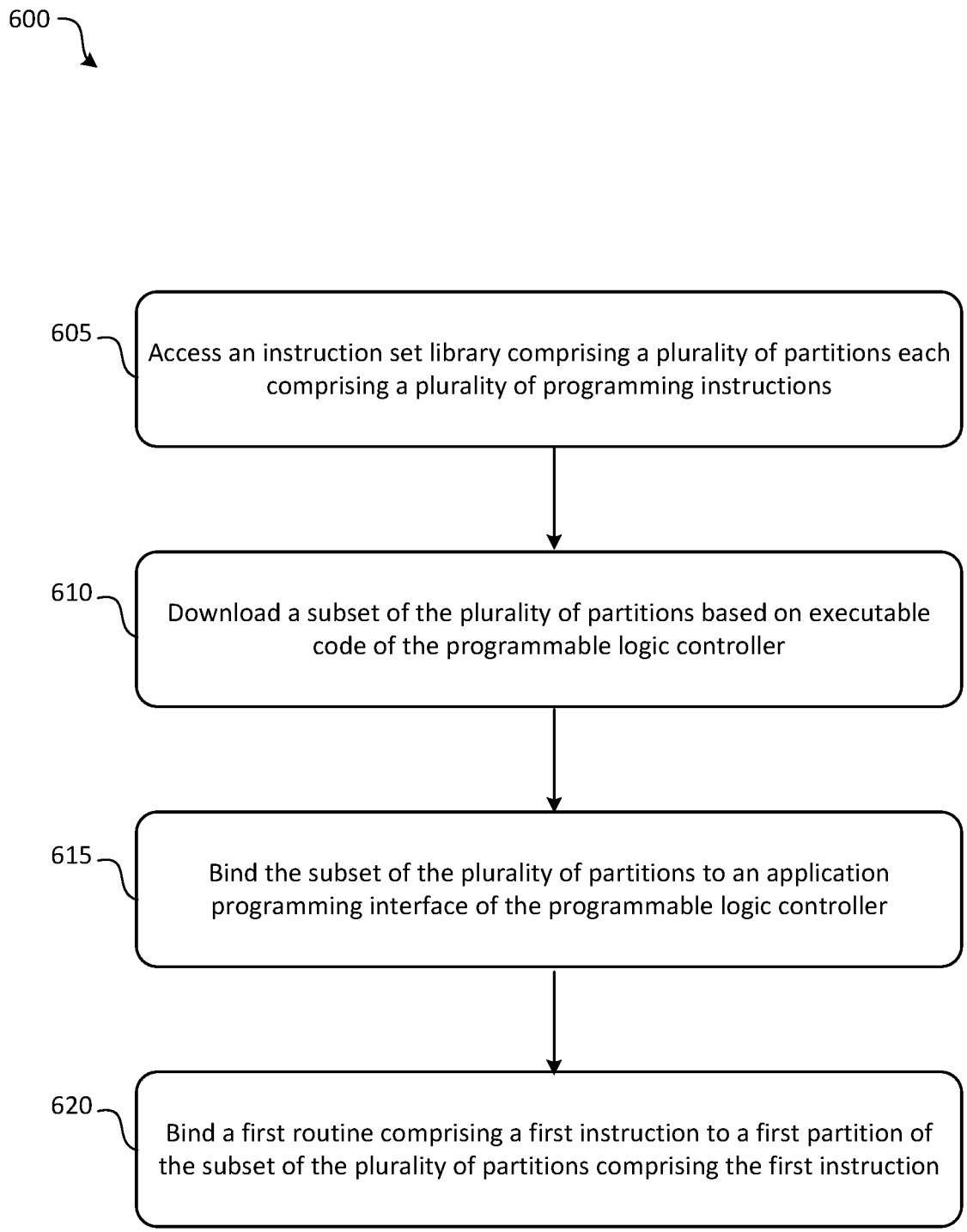
FIG. 6 illustrates an exemplary process for partitioning an instruction set library in programmable logic controller, according to some embodiments.

FIG. 6 illustrates a flowchart 600 for supporting instructions in an instruction set library across versions of a PLC IDE is provided. The method of flowchart 600 may be performed by, for example PLC 400, PLC 210, PLC 240, and/or PLC 115. The PLC may access an instruction set library comprising a plurality of partitions each comprising a plurality of programming instructions at step 605. For example, PLC 115 may access the instruction set library partitions stored in automation server 110. The partitions may include all partitions used by PLCs 115 within automation environment 100. Each partition includes multiple programming instructions. For example, as shown in FIG. 2, each partition 216, 218, 246, 248 include some subset of instructions 222, 224, 226, 228, 230, 252, 254.

At step 610, the PLC downloads a subset of the plurality of partitions based on executable code of the programmable logic controller. For example, the executable code of the programmable logic controller may include one or more programs. For example, as shown with respect to FIG. 4, program A 430, program B 435, and program C 440 are all part of the executable code, which is run sequentially in scans. Accordingly, any instructions used within the routines included in any of the programs in programs 420 may be used to determine which instruction set partitions should be downloaded based on the instructions used in the routines.

At step 615, the PLC binds the subset of the plurality of partitions to an application programming interface of the programmable logic controller. For example, the PLC may bind the instructions within each of the partitions to the API. For example, as shown in FIG. 2, each instruction 222, 224, 226, 228, 230, 252, 254 is bound to APIs 220, 250 as appropriate. In some embodiments, the partitions themselves rather than individual instructions may be bound to the API.

At step 620, the PLC binds a first routine comprising a first instruction to a first partition of the subset of the plurality of partitions comprising the first instruction. For example, as shown in FIG. 4, routine 452 includes an instruction within process 2.2 partition 466. Accordingly, the PLC binds routine 452, which includes the instruction, to process 2.2 partition 466. Later, as also shown in FIG. 4, when the process partition is updated to version 2.3, the PLC rebinds routine 452 to process 2.3 partition 468. In some embodiments, the binding between the routines and the partitions occurs as the ladder logic routines are developed.

Figure 7:
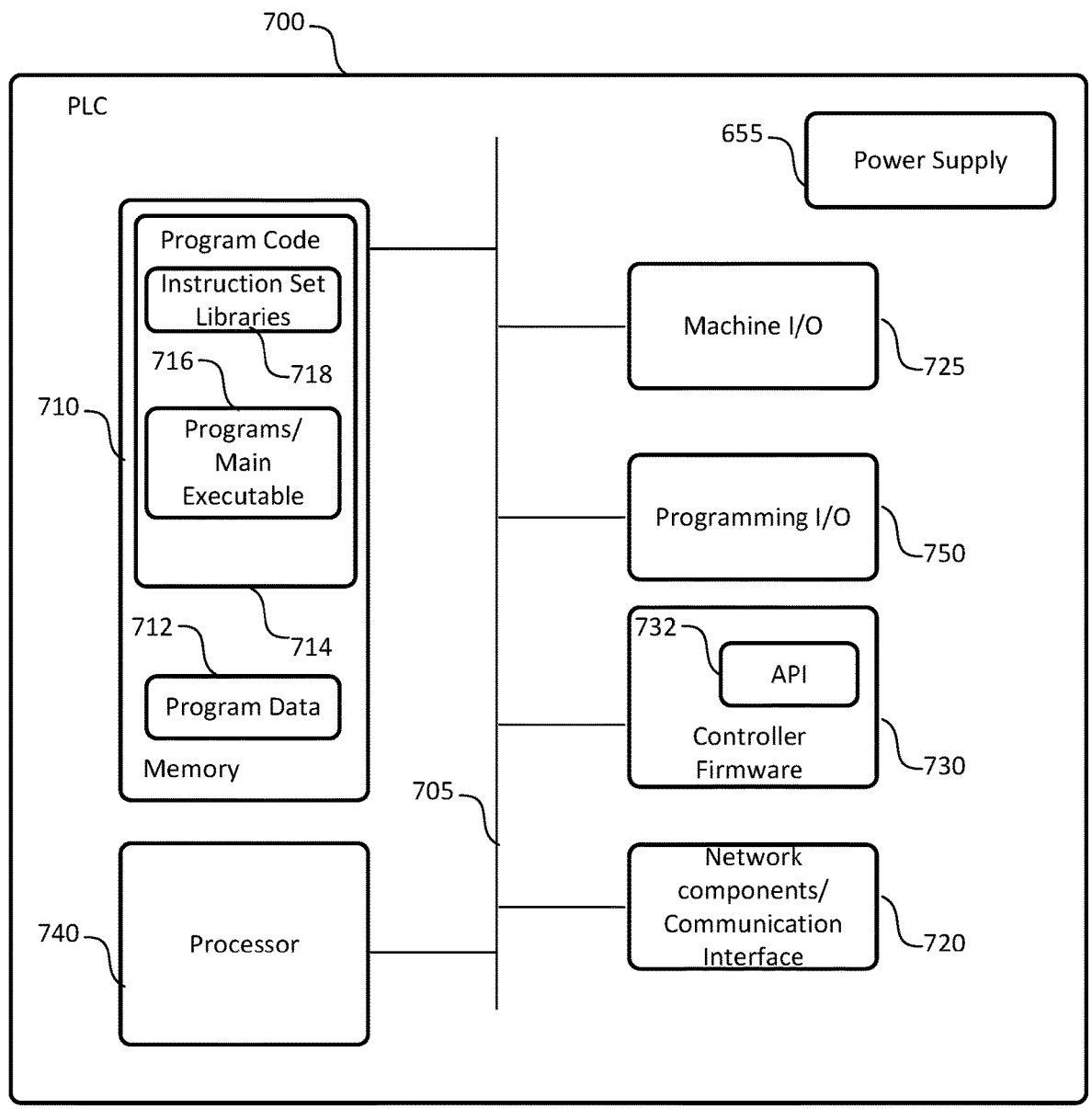
FIG. 7 illustrates an exemplary programmable logic controller, according to some embodiments.

FIG. 7 illustrates a block diagram of an example of a PLC 700. PLC 700 can be any of the described PLCs herein including, for example, PLCs 115, PLCs 210, 240, and/or PLC 400. PLC 700 is a ruggedized computing device designed to withstand the harsh environment of industrial automation environments. As described further below, PLC 700 includes extensive input/output to connect to sensors, actuators, and other control devices of the machines that are controlled by the PLC.

PLC 700 can include a processor 740 interfaced with other hardware via a bus 705. A memory 710, which can include any suitable tangible (and non-transitory) computer readable medium, such as RAM, ROM, EEPROM, or the like, can embody program components (e.g., instruction set libraries 718 and programs 716, which includes the executable code) that configure operation of the PLC 700. Memory 710 can store the program code 714, program data 712, or both. In some embodiments, PLC 700 includes additional storage (not shown). Although FIG. 7 depicts a PLC 700 with a processor 740, the system can include any number of processors 740. For example, dual core or distributed processors may be used.

The PLC 700 executes program code 714 that configures the processor 740 to perform one or more of the operations described herein. Examples of the program code 714 include, in various embodiments, the ladder logic programs, such as programs 420 that include routines used to control the machines via the machine I/O 725. The program code 714 may be resident in the memory 710 or any suitable computer-readable medium and may be executed by the processor 740 or any other suitable processor.

The PLC 700 may generate or receive program data 712 by virtue of executing the program code 714. For example, sensor data from the machines and other data described herein are examples of program data 712 that may be used by the PLC 700 during execution of the program code 714.

The PLC 700 can include network components 720. Network components 720 can represent one or more of any components that facilitate a network connection. In some examples, the network components 720 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 720 can be wired and can include interfaces such as Ethernet, USB, or IEEE 1394. For example, PLCs 115 may communicate with each other or with automation server 110 using network components 720.

PLC 700 includes machine I/O 725 that is coupled to the I/O interfaces of the machines that PLC 700 controls. Typically, there is extensive machine I/O 725 in PLC 700 so that many inputs and outputs can be read and transmitted between PLC 700 and the machines. The machine I/O communicates via the controller firmware 730 with the memory 710, which uses the API 732 to allow routines to utilize the machine I/O 725 signals. The controller firmware 730 provides access to many hardware and embedded functions of the PLC 700 including operating system functions, the PLC scheduler, PLC timers, and the hardware abstraction layer. The API 732 within controller firmware 730 allows access to these hardware and embedded functions by providing an interface for the program code 714 to interact with the controller firmware 730.

PLC 700 includes programming I/O 750 that provides an interface for a technician to review, modify, and create programs (e.g., programs 716 that may be ladder logic programs) to execute for controlling the machines via the machine I/O 725. The programming I/O 750 may provide an interface for a technician to plug a device into the PLC 700 for visualizing the programs.

PLC 700 includes power supply 655. Power supply 655 is an industrial power supply for use in industrial automation environments. In some embodiments, power supply 655 is redundant to avoid environment failure or downtime.

FIG. 8 illustrates a block diagram of an example of a computing device 800. Computing device 800 can be any of the described computers herein including, for example, remote server 105 or automation server 110. The computing device 800 can be or include, for example, an integrated computer, a laptop computer, desktop computer, tablet, server, or other electronic device.

The computing device 800 can include a processor 840 interfaced with other hardware via a bus 805. A memory 810, which can include any suitable tangible (and non-transitory) computer readable medium, such as RAM, ROM, EEPROM, or the like, can embody program components (e.g., program code 815) that configure operation of the computing device 800. Memory 810 can store the program code 815, program data 817, or both. In some examples, the computing device 800 can include input/output ("I/O") interface components 825 (e.g., for interfacing with a display, keyboard, mouse, and the like) and additional storage 830.

The computing device 800 executes program code 815 that configures the processor 840 to perform one or more of the operations described herein. Examples of the program code 815 include, in various embodiments logic as described with respect to FIG. 1 in which the remote server 105 transmits the updates 135 to automation server 110 and the logic within automation server 110 to determine and send updates 135 to the appropriate PLCs 115. The program code 815 may be resident in the memory 810 or any suitable computer-readable medium and may be executed by the processor 840 or any other suitable processor.

The computing device 800 may generate or receive program data 817 by virtue of executing the program code 815. For example, updates 135 and other data described herein are examples of program data 817 that may be used by the computing device 800 during execution of the program code 815.

The computing device 800 can include network components 820. Network components 820 can represent one or more of any components that facilitate a network connection. In some examples, the network components 820 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 820 can be wired and can include interfaces such as Ethernet, USB, or IEEE 1394. Although FIG. 8 depicts a computing device 800 with a processor 840, the system can include any number of computing devices 800 and any number of processors 840. For example, multiple computing devices 800 or multiple processor 840 can be distributed over a wired or wireless network (e.g., a Wide Area Network, Local Area Network, or the Internet). In some embodiments, multiple computing devices 800 are grouped to perform as a single computing device 800 by performing load sharing, load shedding, distributed computing, and the like. The multiple computing devices 800 or multiple processor 840 can perform any of the steps of the present disclosure individually or in coordination with one another.

While some examples provided herein are described in the context of an embedded analytic engine, it should be understood the condition monitoring systems and methods described herein are not limited to such embodiments and may apply to a variety of other condition monitoring environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for updating an instruction set library in a programmable logic controller, the method comprising:
   receiving, by the programmable logic controller, an updated instruction set library comprising a plurality of programming instructions, wherein the updated instruction set library updates a former instruction set library comprising at least a portion of the plurality of programming instructions;
   identifying, by the programmable logic controller, affected routines, wherein the affected routines comprise one or more of the plurality of programming instructions, and wherein the affected routines are executed as part of executable code of the programmable logic controller to provide input signals to and receive output signals from a physical machine in an automation environment;
   breaking, by the programmable logic controller, a binding of the former instruction set library to an application programming interface of a firmware of the programmable logic controller;
   binding, by the programmable logic controller, the updated instruction set library to the application programming interface;
   breaking, by the programmable logic controller, a binding of the affected routines to the former instruction set library; and
   rebinding, by the programmable logic controller, the affected routines to the updated instruction set library, wherein the rebinding is performed between scans of the executable code of the programmable logic controller.

2. The method of claim 1, further comprising:
   deleting, by the programmable logic controller, the former instruction set library from a memory of the programmable logic controller.

3. The method of claim 1, wherein:
   the plurality of programming instructions is a first plurality of programming instructions,
   the former instruction set library comprises a second plurality of programming instructions, and
   the first plurality of programming instructions comprises additional programming instructions not included in the second plurality of programming instructions.

4. The method of claim 1, wherein:
   the plurality of programming instructions is a first plurality of programming instructions,
   the former instruction set library comprises a second plurality of programming instructions, and
   the second plurality of programming instructions comprises a first programming instruction and the first plurality of programming instructions comprises a second programming instruction that is an updated version of the first programming instruction.

5. The method of claim 4, wherein:
   the first plurality of programming instructions comprises the first programming instruction and the second programming instruction.

6. The method of claim 5, wherein:
   the former instruction set library is compiled with a first integrated development environment version;
   the updated instruction set library is compiled with a second integrated development environment version;
   the firmware of the programmable logic controller is versioned based on the first integrated development environment version; and
   the binding comprises binding the first instruction to the application programming interface and not binding the second instruction to the application programming interface.

7. The method of claim 5, wherein:
   the former instruction set library is compiled with a first integrated development environment version;
   the updated instruction set library is compiled with a second integrated development version;
   the firmware of the programmable logic controller is versioned based on the second integrated development environment version; and
   the binding comprises binding the second instruction to the application programming interface and not binding the first instruction to the application programming interface.

8. The method of claim 1, wherein the updated instruction set library is a first instruction set library of a plurality of instruction set libraries in the programmable logic controller and the plurality of programming instructions is a first subset of programming instructions and wherein each of the plurality of instruction set libraries comprises a different subset of programming instructions.

9. The method of claim 1, wherein binding the updated instruction set library to the application programming interface binds the updated instruction set library to firmware functions of the programmable logic controller.

10. A programmable logic controller comprising:
    controller firmware comprising an application programming interface;
    a processor; and
    a memory having stored thereon:
       an instruction set library comprising of a plurality of instructions that are bound to the controller firmware via the application programming interface; and
       executable code comprising a plurality of routines that, when executed, cause the processor to provide input signals to and receive output signals from a physical machine in an automation environment, wherein each of the plurality of routines comprise instructions from the plurality of instructions.

11. The programmable logic controller of claim 10, wherein the instruction set library is divided into partitions, each partition comprising a subset of the plurality of instructions.

12. The programmable logic controller of claim 10, wherein the instruction set library comprises a portion of a complete plurality of instructions, wherein the plurality of instructions is selected from the complete plurality of instructions based on the plurality of routines.

13. A method for supporting programming instructions in a programmable logic controller across versions, the method comprising:
accessing, by the programmable logic controller, an instruction set library comprising a plurality of partitions each comprising a plurality of programming instructions;
downloading, by the programmable logic controller, a subset of the plurality of partitions based on an executable code of the programmable logic controller;
binding, by the programmable logic controller, the subset of the plurality of partitions to an application programming interface of a firmware of the programmable logic controller; and
binding, by the programmable logic controller, a first routine comprising a first instruction to a first partition of the subset of the plurality of partitions comprising the first instruction.

14. The method of claim 13, further comprising:
receiving, by the programmable logic controller, an updated first partition comprising the first instruction, wherein the updated first partition updates the first partition;
breaking, by the programmable logic controller, a binding of the first partition to the application programming interface;
binding, by the programmable logic controller, the updated first partition to the application programming interface;
breaking, by the programmable logic controller, a binding of the first routine to the first partition; and
rebinding, by the programmable logic controller, the first routine to the updated first partition between scans of the executable code.

15. The method of claim 14, wherein:
the first partition comprises a second instruction; and
the updated first partition comprises an updated second instruction that updates the second instruction.

16. The method of claim 15, wherein:
the updated first partition comprises the second instruction and the updated second instruction.

17. The method of claim 16, wherein:
the first partition is compiled with a first integrated development environment version;
the updated first partition is compiled with a second integrated development environment version;
the firmware of the programmable logic controller is versioned based on the first integrated development environment version; and
the binding the updated first partition to the application programming interface comprises binding the second instruction to the application programming interface and not binding the updated second instruction to the application programming interface.

18. The method of claim 16, wherein:
the first partition is compiled with a first integrated development environment version;
the updated first partition is compiled with a second integrated development environment version;
the firmware of the programmable logic controller is versioned based on the second integrated development environment version; and
the binding the updated first partition to the application programming interface comprises binding the updated second instruction to the application programming interface and not binding the second instruction to the application programming interface.

\* \* \* \* \*